Oct. 10, 1939.   F. W. SEVERIN   2,176,015
VALVE ACTUATING MECHANISM
Filed Nov. 26, 1937
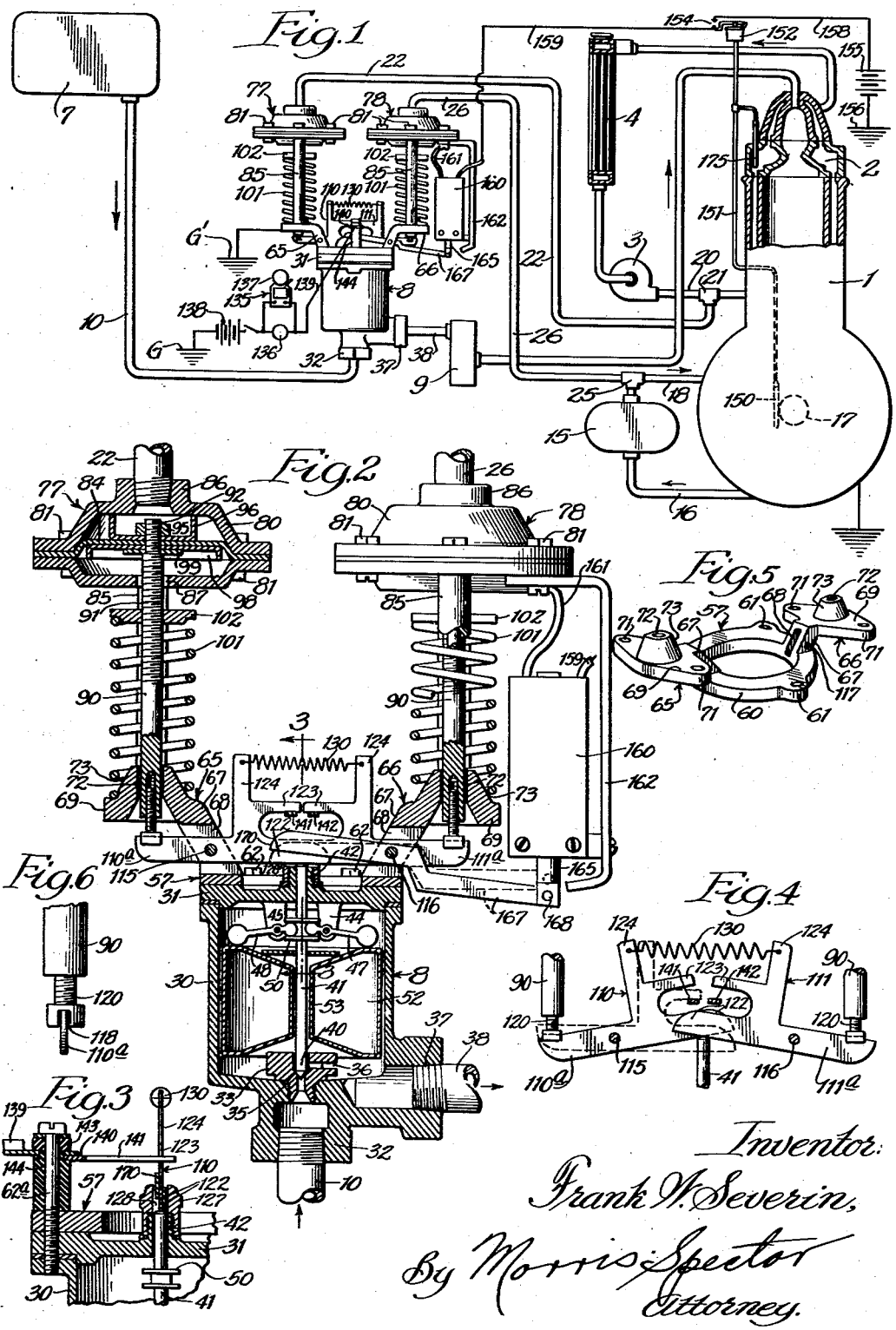
Inventor:
Frank W. Severin,
By Morris Spector
Attorney.

Patented Oct. 10, 1939

2,176,015

UNITED STATES PATENT OFFICE 2,176,015

VALVE ACTUATING MECHANISM

Frank W. Severin, Evanston, Ill., assignor to Venn-Severin Machine Co., Chicago, Ill., a corporation of Illinois Application November 26, 1937, Serial No. 176,577

10 Claims. (Cl. 137—139)

This invention relates to automatic controls for internal combustion engines and the like, and is particularly concerned with mechanism which shuts down the engine in the event of defective operation or failure of either the cooling system or the lubrication system, or in the event of an excessive temperature rise in one or more of the bearings or in the cooling medium of the engine.

It is one object of this invention to provide a simplified arrangement, whereby the continued operation of the engine is made dependent on the proper pressure in the cooling and lubrication systems, in which the pressure responsive units associated with the two systems are operatively connected to an engine controlling member or part in an improved manner.

A further object of the invention is the provision of means responsive to the temperature of the bearings or other parts of the engine or parts operatively associated with the engine and acting through the same means as the other responsive units for stopping the engine when its continued operation is unsafe or undesired, because of an abnormal condition of the engine or of the mechanism driven thereby or operatively associated therewith.

It is another object of my invention to arrange these controls so that in the event any of them operate to stop the engine the operator or attendant can determine readily the abnormal condition that caused the engine to stop.

These and other objects of my invention will be apparent from the following specification, taken in conjunction with the accompanying drawing forming a part thereof.

In the drawing:

Figure 1 is a view, partly diagrammatic, of one form of control system embodying my invention;

Figure 2 is an enlarged view of a portion of the apparatus shown in Figure 1, showing the parts in the position they occupy when the engine controlling valve is closed;

Figure 3 is a section taken along the line 3—3 of Figure 2;

Figure 4 is a fragmentary view showing certain of the operating levers in a position in which the engine controlling valve is open;

Figure 5 is a perspective of the supporting member for the pressure responsive units; and Figure 6 is a fragmentary view of the mechanism for adjusting the pressure responsive units.

Referring first to Figure 1, the engine to be controlled is indicated by the reference numeral 1 and is of the Diesel type having the usual form of water cooling jacket 2, a water circulating pump 3 circulating water or other cooling medium through the engine jacket 2 and a radiator or other heat exchange device 4, which may be elevated a considerable amount above the engine, by means of the usual piping connections. The engine is also provided with a fuel injection system that includes a fuel supply tank 7, a constant level float valve unit 8, and a fuel pump 9. The latter receives fuel from the tank 7 through a supply pipe 10 under the control of the unit 8. The engine 1 is also provided with a pressure lubricating system that includes a pump 15 drawing lubricant from a sump in the crank case of the engine 1 through a line 16 and delivering it to the engine bearings 17 and other parts through a line 18.

According to the principles of the present invention I have provided improved means for stopping the engine 1 in the event of the improper operation or failure of either the cooling system or the lubrication system, or in the event of excessively high bearing temperatures, which might occur as a result in any one of a number of ways, as for example due to a clogged line leading to one or more of the bearings but which would not be manifest by any means responsive, for example, to the pressure developed in the lubrication system as a whole. The apparatus I have provided for controlling the engine according to the above factors includes a unit responsive to the pressure developed in the cooling system, a second unit responsive to the pressure developed in the lubrication system, and a third unit responsive to temperatures. In the third unit I have also incorporated means that is responsive to the temperature of the cooling liquid, thus also controlling the engine according to cylinder head temperatures.

In the line 20 leading from the water circulating pump 3 to the engine I insert a T 21 and connect thereto a line 22. In the line 18 leading from the oil pump 15 to the engine I connect a T 25 to which is connected another line 26. The lines 22 and 26 connect, respectively, to two pressure responsive units which are mounted upon a common support fixed in any suitable manner to the float valve unit 8 between the fuel line 10 and the fuel pump 9.

Referring now more particularly to Figure 2, the float valve unit in the fuel line may be of a standard construction and comprises a casing 30 closed at its upper end by a cap 31 and provided at its lower end with an internally threaded coupling section 32 which serves as an inlet for the casing and receives the fuel pipe 10. An insert 33 is threaded into the bottom of the casing from the interior in communication with the inlet 32 and is provided with a needle valve seat 35 and an outlet port 36 above the seat 35. The casing has an outlet 37 to which a short pipe 38 leading to the fuel pump 9 is connected.

A needle valve 40 is disposed centrally of the casing 30 and has a lower pointed end serving as a valve proper for controlling the flow of fuel from the tank 7 through the casing 30 to the fuel pump 9. The stem 41 of the needle valve 40 extends at its upper end exteriorly of the casing 30, through a threaded apertured boss 42 formed on the upper side of the cap 31. On the lower side, the cap 31 is provided with two pairs of downwardly extending lugs 44 and 45 which receive the pivots on which two float controlled levers 47 and 48 are mounted. The inner ends of the levers lie in a groove formed in a collar 50 fixed to the stem of the valve 40, and the outer ends of the levers 47 and 48 are weighted and are in engagement with and operated by a float 52 movably mounted within the casing 30 and having an inner tubular sleeve 53 through which the valve stem extends. As will be clear from Figure 2, when the float 52 is down, the outer weighted ends of the levers 47 and 48 move downwardly and act through the collar 50 to raise the valve 40 off its seat 35, thereby admitting fuel into the casing 30. As the liquid level in the casing rises, the valve levers 47 and 48 pivot about their supports on the lugs 44 and 45 and move the valve 40 toward and into engagement with its seat 35, thus shutting off the flow of fuel into the casing. The fuel valve unit 8 is therefore a constant level device from which the pump 9 withdraws fuel for the operation of the engine, and as will be clear if the valve 40 is for any reason held closed the engine will shortly be stopped for lack of fuel.

Mounted in the casing 30, preferably on the cap 31, is a supporting member 57. The supporting member, best shown in Figure 5, comprises a casting including a ring-like body portion 60 provided with peripherally spaced apertured lugs 61 by which the member 57 can be detachably mounted on the casing 30 in a position surrounding the valve stem 41, as by screws 62 and 62a, Figures 2 and 3. At opposite points the ring 60 is provided with upwardly and outwardly directed extensions 65 and 66. As best shown in Figure 5 each of these extensions includes an angled section 67 having a slot 68 therethrough, and an upper horizontal section 69. Each of the horizontal sections 69 has lateral attaching apertured lugs 71 and a central opening 72 surrounded by an upwardly directed coniform flange 73.

The cooling system pressure line 22 and the lubrication system pressure line 26 are connected, respectively, to two pressure responsive units that are carried upon the supporting member 57 and which control the valve 40 in a manner which will now be described.

The two responsive units are indicated generally at 77 and 78 and are substantially identical so that a description of one will largely suffice for both. The pressure responsive unit 77, which is connected to the cooling system pressure line 22, comprises a diaphragm casing 80 made up of two parts bolted together at 81 and on opposite sides of a flexible diaphragm 84. A pair of posts 85 serve to support the casing 77 in vertically spaced position on the member 57 and at their lower ends are fastened to the attaching lugs 71 on the member 57. The upper part of the casing 80 has a threaded boss 86 connected to the pressure line 22 and the lower part has an enlarged opening 87 through which an operating rod 90 extends with clearance so that the under side of the diaphragm is subject to atmospheric pressure. The upper end of the rod 90 is threaded, as at 91, and has a reduced end 92, also threaded, that passes through the central portion of the diaphragm 84 and receives a clamping nut 95 which bears against a flanged washer 96 and when tightened forces the diaphragm down against another flanged washer 98, a third washer 99 being disposed between the part 98 and the shoulder on the rod between the portions 91 and 92. The flanges of the washers 96 and 98 engage, respectively, the upper and lower parts of the diaphragm casing 77 and thereby serve as stops to limit the movement of the diaphragm in each direction.

A spring 101 encircles the rod 90 and at its lower end is disposed about the coniform flange 73 and bears against the supporting member 57. At its upper end the spring acts against an adjusting nut 102 which is adjustably threaded on the rod 90. As will be seen, the position of the adjusting nut 102 on the rod 90 determines the effective force exerted by the spring 101 in opposing downward movement of the diaphragm 84 in response to pressure exerted against it by the fluid from the line 22, but the extent of movement of the diaphragm is determined by the stop washers 96 and 98 and is independent of the position of the adjusting member 102.

The other pressure responsive unit 78 is of substantially identical construction as the unit 77 just described, and hence the same reference numerals have been applied wherever like parts are indicated. The pressure line 26 from the lubrication system is connected to the diaphragm casing 80.

A novel lever mechanism which is employed for controlling the fuel valve 40 from either of the pressure responsive units 77 and 78 will now be described. A pair of levers 110 and 111, preferably but not necessarily identical, are mounted in opposite relation on the supporting member 57 and have ends 110a and 111a extending through the slots 68 in the angled portions of the supporting member 57 and mounted for pivotal motion in a vertical plane on pivot pins 115 and 116 that are journalled in aligned holes 117 in each angle section 67. The outer ends 110a and 111a are disposed in the kerfs 118 of adjusting screws 120 which are threaded into the lower ends, respectively, of the operating rods 90 of the units 77 and 78. As will be obvious, threading the screw inwardly or outwardly of the lower end of the associated rod 90 adjusts the operative relation between the diaphragm and the lever, while the disposition of the end of the lever in the kerf serves to retain the adjustment desired. In order to effect an adjustment, the lever is held manually out of engagement with the screw while the latter is threaded upwardly or downwardly into the desired position.

Each of the levers 110 and 111 is provided at its inner end with a valve shifting arm 122, a contact actuating arm 123 and a spring receiving arm 124. The valve actuating arms 122 of the two levers are disposed in overlapping relation, as best shown in Figures 2, 3 and 4, in abutting contact with the upper end of the stem 41 of the valve 40. A guide thimble 127 is threaded onto the boss 42 on the upper portion of the cap 31, and is provided with a slot 128 to receive the levers and guide them in their movements. A single spring 130 is anchored at its opposite ends to the arms 124 of the two levers so as to swing the levers toward one another and press the ends 122 down against the valve stem 41. The spring 130 is a light spring proportioned so as to be capable of exerting only slightly more than sufficient bias to overcome the weight of the float 52 and associated parts and close the valve 40 when called upon to do so by either or both of the pressure units 77 and 78, even if there should be a low level of fuel in the casing 30 with the float normally acting to open the valve 40.

The operation of the structure so far described is substantially as follows:

Normally the pressures developed in the cooling system and in the lubrication system are sufficient to move the diaphragms 84 of the two units 77 and 78 downwardly against the force of the springs 101, and in doing so the rods 90 swing the two levers 110 and 111 so as to elevate the inner valve operating ends 122 from the valve stem 41, in the manner indicated in Figure 4, thus permitting the float 52 to govern the operation of the valve 40 in the usual manner. By virtue of the non-abutting engagement of the valve levers 110 and 111 with the valve stem, when the levers are held in their elevated positions, the valve stem can move upwardly or downwardly, as determined by the liquid level in the casing 30, without interference by the levers. However, upon the occurrence of a dangerous or undesired reduction in the pressure communicated to either or both of the units 77 and 78 by the lines 22 and 26, which would indicate a pump failure, a loss of lubricant or cooling medium, or some other trouble, the spring 101 of the unit affected will immediately move upwardly since the pressure on its diaphragm is reduced.

The upward movement of the diaphragm relaxes the pressure exerted by the rod 90 on the outer end of the associated lever, so that the spring 130 acts to swing the inner end 122 of the lever down against the valve stem 41, closing the valve 40 and shutting off the engine as soon as the relatively limited quantity of fuel remaining in the casing 30 is exhausted. The engine will run for a few minutes before stopping, and this may give the attendant time enough to cure the difficulty that caused the pressure responsive unit to act.

An alarm, indicated by the reference numeral 135 in Figure 1, is provided, and is arranged to be responsive to the actuation of either of the units 77 and 78. The alarm means 135 consists of a lamp 136, or a bell or other audible signal 137, or both, energized by a battery 138 or other source of current. One terminal of the battery is connected to a ground G and the other terminal is connected through the devices 136 and 137 and a conductor 139 to a contact spring 140 having two arms 141 and 142 and disposed, as best shown in Figures 2 and 4, in a position immediately under the contact sections 123 of the levers 110 and 111. Preferably, the contact spring 140 is mounted on the member 57 by two insulating sleeves 143 and 144 fastened by the screw 62a, as best shown in Figure 3. The supporting member 57 is grounded, as at G'. When either or both of the levers 110 and 111 are released by a reduction of pressure in either or both of the units 77 and 78 and swing under the action of the spring 130, the end or ends 123 engage the contact sections 141 and 142 and thereby complete the circuit through the alarm. When the attendant responds he can at once observe which of the levers 110 and 111 has been actuated and can tell therefrom what undesired condition in the engine has been brought about. In a number of instances he may be able to correct the trouble before the fuel in the casing has been exhausted and the engine actually stopped.

According to the present invention provision is made for also stopping the engine in the event of an excessive temperature rise in the cooling system or a bearing overheating. While I will describe the mechanism I have provided to this end as concerned with only one bearing it will be understood that as many bearings as desired may be protected. Referring now to Figure 1, adjacent the bearings 17 is disposed a thermostatic bulb element 150 which is connected by capillary tubing 151 to an operating element 152, which is of any desired construction wherein the expansion of the fluid contained in the bulb 150 is transmitted thereto and closes a pair of contacts 154. The latter are connected in a circuit that includes a battery 155, one terminal of which is grounded at 156, a pair of conductors 158 and 159, and a solenoid 160, grounded to the pressure responsive unit 78 by a short lead 161 and supported on the unit 78 by a bracket 162.

The solenoid 160 has a plunger 165, to the lower end of which a third valve actuating lever 167 is pivoted, as at 168 (Figure 2). The lever 167 is mounted on the same pivot 116 as the valve lever 111, and has its inner end 170 disposed alongside the inner ends of the other levers 110 and 111 and resting in the slot in the guide 127, as best shown in Figure 3, in operative relation above the upper end of the valve stem 41. Thus, if the bearing 17 should overheat, the fluid in the bulb 150 will expand and cause the operator 152 to close the contacts 154 and energize the solenoid 160. The resulting upward movement of the plunger 165 swings the inner or left-hand end of the lever 167 downwardly, into engagement with the valve stem 41, and closes the valve 40. While I have shown only one thermostatic element 150 it is to be understood that as many elements 150 may be employed as there are bearings it is desired to protect or other parts that may become overheated upon operation of the engine.

According to the principles of my invention another thermostatic element 175 is connected into the capillary line 151 and is also filled with fluid which expands when overheated, and actuates the operator 152 to close the contacts 154. The thermostatic element is disposed within the water jacket 2, and hence if the temperature of the cooling medium should rise excessively, the element 175 will close the contacts 154 and act through the solenoid 160 to close the fuel valve 40. If desired, there may be more than one element 175 but usually one is sufficient. Obviously, while I have shown the cooling medium thermostat 175 as connected into the line of the bearing thermostat 150, the cooling medium thermostat may have its own operator and contacts.

After the unit has been operated to shut the valve unit 8, in response to an abnormal condition, and the engine has stopped upon the consumption of the fuel in the valve 8, the valve thereafter remains closed. When the abnormal condition has been corrected and it is desired to start the engine, the valve 8 is first partially filled with a supply of fuel. This may be done by merely swinging the spring receiving arms 124—124 of the two levers 110—111 away from one another, about their respective pivots 115—116, until the valve lifting arms 122—122 are raised. This permits opening of the inlet to the valve unit 8 by rising of the valve stem 40 under the action of the weighted valve levers 47—48. The only force required to swing the arms 124—124 away from one another to cause this filling action is the force required to overcome the tension of the comparatively light spring 130. The swinging of the levers 110—111 causes the arms 110a—111a to leave the kerfs 118 of the screws 120 so that the levers 110—111 do not have to draw the rods 90 downwardly against the action of the comparatively powerful springs 101. After the requisite amount of fuel has entered the valve unit 8 the float 52 thereof closes the valve 40—41, and the engine may then be started in the usual manner. In the case of a Diesel engine this is done in any one of a number of ways as, for instance, by means of a small auxiliary engine, or by means of energy derived from tanks of compressed air, in a manner well known in the art.

In compliance with the requirements of the patent statutes I have here shown and described a preferred embodiment of my invention. It is, however, to be understood that the invention is not limited to the precise construction here shown, the same being merely illustrative of the principles of the invention.

What I consider new and desire to secure by Letters Patent is:

1. The combination with an operating unit including a casing and a valve therein provided with a stem, of a pair of levers pivotally mounted on the casing and each having a portion engageable with said stem to move the valve independently of the other lever, spring means acting against one lever and reacting against the other lever for moving either lever to actuate said valve, and separate auxiliary controlling means serving to determine the position of each lever independently of the other.

2. The combination with an operating unit including a casing and a valve therein provided with a stem, of a pair of levers pivotally mounted on the casing and each having a portion engageable with said stem to move the valve independently of the other lever, spring means acting against one lever and reacting against the other lever for moving either lever to actuate said valve, and two separate means, one associated with each lever and each operable independently of the other to prevent said spring means from moving the associated lever and shifting the valve, the other lever being free to shift the valve under the control of the other separate means.

3. In combination, a valve casing, a valve therein having a stem extending therefrom, a lever-supporting member fixed to said casing, a plurality of levers pivoted to peripheral portions of said member, each lever having a portion extending generally radially inwardly toward and in operative engagement with said valve stem, spring means acting between two of said levers to cause either of them to operate said valve and means associated with each lever for releasably holding it against the action of the spring means.

4. In combination, a valve casing, a valve therein having a stem extending therefrom, a lever-supporting member fixed to said casing, a plurality of levers pivoted to peripheral portions of said member, each lever having a portion extending generally radially inwardly toward and in operative engagement with said valve stem, a spring anchored at one end to one lever and at the other end to another lever, whereby the bias of said spring is adapted to cause either of said two levers to operate said valve, a contact finger on each of said two levers, and a pair of associated contacts carried by and insulated from said casing and adapted to be engaged by said first contacts, respectively, by the action of said spring against said levers.

5. In combination, a valve casing having a valve therein and an apertured boss through which one end of said valve extends, a supporting member fixed to said casing about said boss and having lever-receiving portions, levers pivoted to said portions and having their inner ends in abutting engagement with the extending end of said valve, and a cap mounted on said boss and having a slot receiving said inner ends of said levers and guiding them into engagement with the end of said valve.

6. In combination with a device having a valve housing and a valve movably disposed therein, of a supporting member detachably fixed to said housing and having an angularly disposed portion with an aperture therein, a lever extending through said aperture and operatively connected adjacent one end to operate said valve, there being attaching portions on said supporting member, an auxiliary controlling device connected to said attaching portions, and means connecting the other end of said lever with said auxiliary device.

7. In combination with a device having a valve housing and a valve movably disposed therein, of a supporting member detachably fixed to said housing and having a slot therein and a flanged opening outwardly of said slot, said supporting member having a section embracing the end of the stem of said valve, a lever extending through said slot, with one end overlying said stem and the other end disposed underneath said flanged opening, and an auxiliary controlling device mounted on said supporting member and including a part disposed about said flange and another part extending through said opening, into operative connection with said other end of the lever.

8. The combination with a device having a valve casing and a valve movably disposed therein and having a stem extending therefrom, of a supporting member fixed to said casing about said valve stem and having a pair of oppositely disposed slotted portions, a lever mounted on one pivot pin and extending through the associated slot into operative engagement with said stem, a pair of levers mounted on the other pivot pin and both disposed alongside one another in the other slot, and into operative engagement with said stem alongside the end of said first lever, and separate controlling means connected, respectively, with the ends of said levers outwardly of said pivot pins.

9. The combination with a device having a valve casing and a valve movably disposed therein and having a stem extending therefrom, of a supporting member fixed to said casing about said valve stem and having a pair of oppositely disposed slotted portions, a pivot pin supported in each of said slotted portions, a lever mounted on one pivot pin and extending through the associated slot into operative engagement with said stem, a pair of levers mounted on the other pivot pin and both disposed alongside one another in the other slot, and into operative engagement with said stem alongside the end of said first lever, a pair of oppositely arranged controlling units mounted on the ends of said supporting member outwardly of said pivot pins, one including an operating part disposed in abutting engagement with the outer end of said first lever, the other controlling unit including an operating part disposed in abutting engagement with one of said pairs of levers, whereby the actuation of either unit can shift said valve stem away from the other lever and actuate said valve, a supporting bracket carried by one of said auxiliary controlling units, and a third controlling unit operatively connected with the other of said pair of levers, whereby the actuation of said third unit shifts said valve stem away from both of said first and second levers.

10. An article of manufacture comprising an attachment base having an intermediate ring-like section, apertured lugs formed thereon, and a pair of oppositely disposed generally upwardly and outwardly directed extensions, each including a flanged opening and a pair of apertured lugs, there being lever-receiving slots in the upwardly extending sections.

FRANK W. SEVERIN.